Sept. 14, 1926. 1,599,885
J. H. GRACE
SMELTING FURNACE
Filed June 11, 1925 2 Sheets-Sheet 1
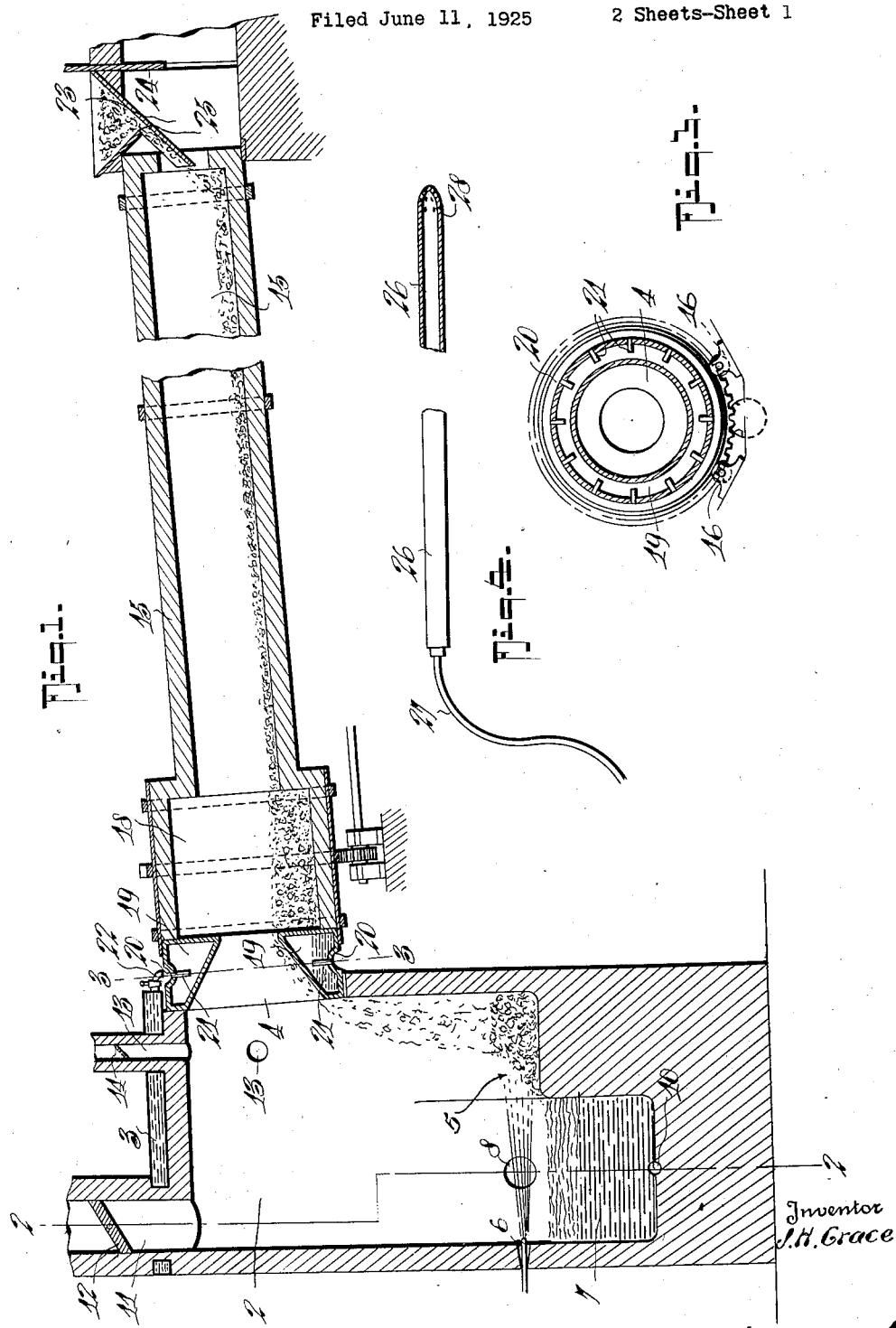

Sept. 14, 1926.
J. H. GRACE
1,599,885
SMELTING FURNACE
Filed June 11, 1925  2 Sheets-Sheet 2
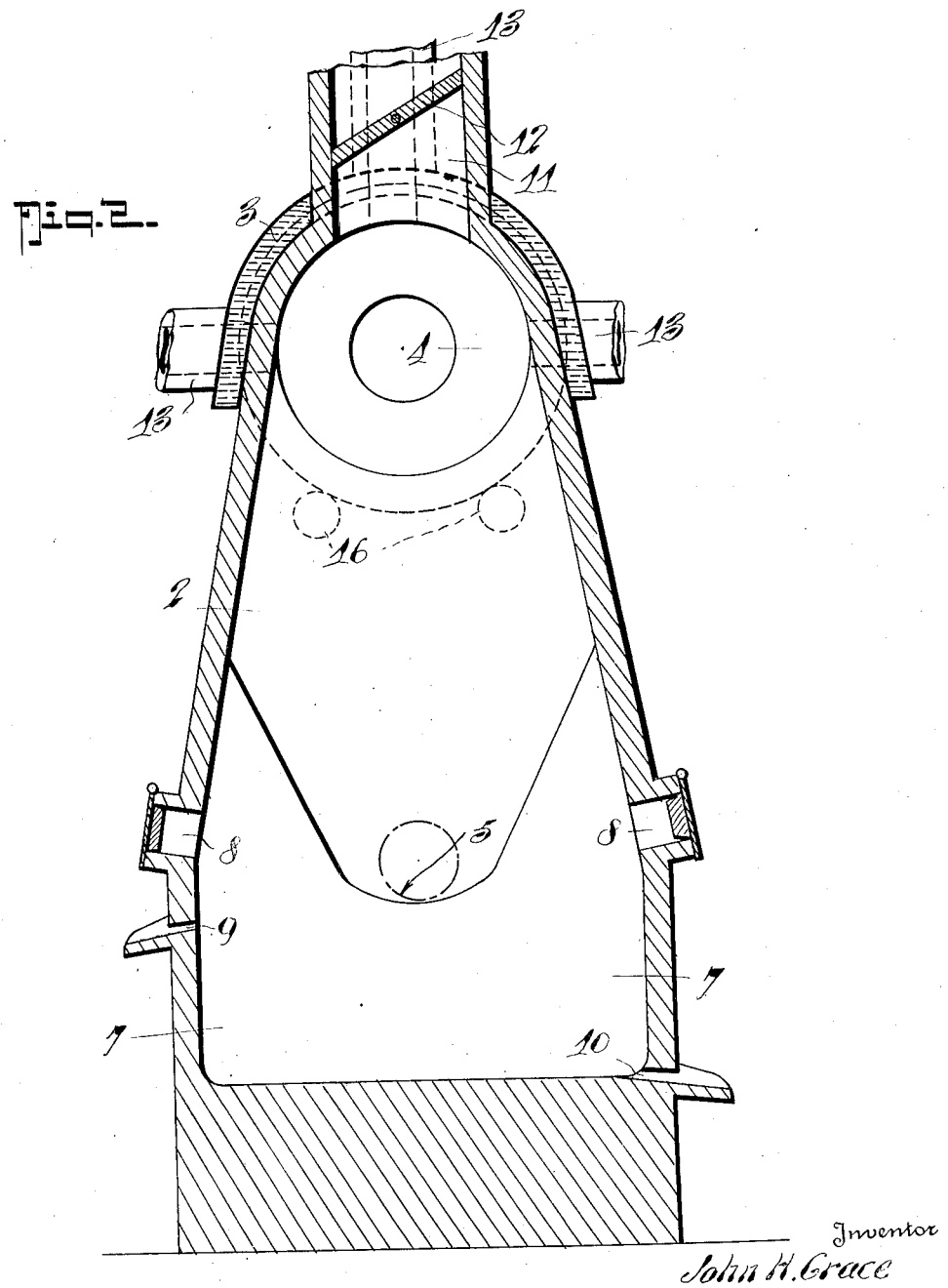

Patented Sept. 14, 1926.

1,599,885

UNITED STATES PATENT OFFICE.

JOHN H. GRACE, OF VANCOUVER, BRITISH COLUMBIA, CANADA, ASSIGNOR OF ONE-FOURTH TO GEORGE WHALEN, OF VANCOUVER, CANADA.

SMELTING FURNACE.

Application filed June 11, 1925. Serial No. 36,508.

This invention relates to a means for smelting a refractory iron ore, such as magnetite, where coking coal is not obtainable except at a prohibitive price, but where there is a plentiful supply of a low grade bituminous coal or lignite and of suitable fluxes.

In the furnace, which is the subject of this application, the ore with the limestone as its flux and a reducing agent, such as coal, which need not be of high grade, is first reduced in a rotary kiln of known type and is delivered therefrom in a fully reduced condition and associated with a high percentage of carbon, such as the coke residue of the coal.

This spongy iron and carbon in a loose disintegrated condition is delivered directly on the hearth of a smelting furnace where it is subjected to the heat of a strong flame directed on it. It is the waste heat of this flame that effects the reduction of the charge in the kiln.

As the charge is melted under the direct heat of this flame, it flows into the crucible occupying the lower part of the smelting furnace, and when a sufficient amount is collected in the crucible, the slag is run off and the charge is purified by a pneumatic rabbling tool which is inserted through a closable opening in each side of the furnace. After all impurities have been burnt from the charge such other metal is added as it may be required to alloy the metal with, and the charge is run off.

The invention is fully described in the following specification, reference being made to the drawings by which it is accompanied, in which:

Fig. 1 is a vertical longitudinal section of the reducing kiln and smelting furnace.

Fig. 2 is a cross section of the smelting furnace to a larger scale on the line 2—2 in Fig. 1.

Fig. 3 is a cross section of the end of the reducing kiln which is rotatably connected to the smelting furnace, and Fig. 4, a section of the rabbling tool.

In these drawings 2 represents the smelting furnace which is preferably rectangular in plan with sloping sides and an arched roof. This chamber is lined with a suitable fire-brick and the roof is water-jacketed as at 3. In the upper front of this chamber is a circular aperture in which the lower end 4 of a reducing kiln 15 is rotatable and immediately below this inserted end 4 is a hearth 5, the sides of which converge, as shown in Fig. 2, to form a ledge on which the charge as delivered from the reducing kiln is retained in alignment with the axis of a burner 6 in an aperture in the front of the chamber 2.

Through this burner 6 a flame of liquid or powdered fuel is projected on the charge of reduced ore on the hearth 5.

Immediately below the hearth 5 and occupying the lower front portion of the chamber 2 is the crucible 7 into which the charge flows as melted on the hearth. At the required height above the bottom of this crucible is a slag tapping aperture 9, and on each side at approximately the level of the hearth are closable apertures 8 through which a penumatic rabbling tool, to be described later, may be passed and operated. In the level of the bottom of the crucible 7 is a tapping aperture 10 through which the charge may be run off when ready.

Through the roof of the chamber 2 immediately over the crucible is a gas delivery outlet 11 closable with a valve 12, and adjacent the aperture in which is the end 4 of the reducing kiln, are three relatively smaller gas outlets 13, each closable with a valve 14. By the valves of these outlets the temperature of the furnace gases as delivered to the kiln 15 may be controlled.

The reducing kiln comprises a relatively elongated cylinder 15 lined with fire-brick and rotatably mounted on rollers at 16.

Adjacent the lower end of the kiln is an enlargement 18 which is contracted and again conically enlarged at the end 4 which is inserted in the furnace 2. This contracted and conically enlarged end 4 is cast with a water-jacket space 19 and around the outer side approximately opposite the midlength of the inner conical slope has a circumferential groove 20, and around the bottom of the groove are apertures 21 at intervals apart.

A pipe 22 delivers water from the jacket space of the roof 3 into the groove 20 to run down both sides and through the apertures 21 and supply the jacket space 19 with water.

At the other end, this cylindrical kiln 15 delivers into a flue to the smoke-stack or up-take at 23 with a valve 24 controlling such delivery. The ore, limestone, and coal, broken small, are fed into this end of the kiln through a chute 25, and the kiln being angled slightly downward toward its connection to the smelting furnace, the material progresses slowly along it as it rotates.

During the earlier part of the progress of the charge along the kiln, the volatile constituents of the charge are driven off and the metal of the ore is reduced under conditions that retain the loose separate character of its particles. It is retained in the enlargement 18 for a sufficient time to ensure thorough reduction.

When the charge overflows from 18 and is delivered on the hearth 5, the ore is in a spongy condition favourable for fusion by the flame from the burner 6. The fact that there is a considerable surplus of carbon in the charge, when delivered on the hearth, ensures a reducing atmosphere in both the furnace 2 and the kiln 15.

The flame from the burner 6 quickly effects melting of the charge on the hearth 5, and as melted it flows into the crucible 7. When there is sufficient accumulation in the crucible 7 the slag may be tapped from it through the outlet 9.

The pneumatic rabbling tool consists of a tube 26, to one end of which a service of air under pressure is connected at 27 and the other end of which has a series of apertures 28.

This tool is introduced through either closable aperture 8 and manually operated back and forth in the fluid metal, whereby the impurities in the metal are burned out of it by combustion of the air delivered under pressure through the apertures 28 of the tool.

While being rabbled the damper 24 is closed to prevent the oxidizing flame from passing through the reducing kiln and the valve 12 of the gas exit 11 is opened to provide for escape for these gases immediately over the crucible.

When the impurities have been burnt out any desired alloy may be introduced into the charge in the crucible and the charge poured.

As previously explained, the water-jacketing of the end 4 of the kiln, which delivers into the furnace chamber 2, and the provision of the closable gas escape apertures 13 adjacent that delivery, are designed to keep down and regulate the temperature of the gases delivered to the kiln for that temperature must not be such as will cause fusion or agglomeration of the charge in the enlargement 18 of the kiln.

It is an important requirement that a surplus of carbon be in the charge as delivered from the kiln 15 to the hearth 5 of the smelting furnace 2, and that the loose character of the charge be retained. It is for this reason that an inferior grade of coal is preferable, as, if a coking coal is used as a reducing agent, there is every likelihood of the charge agglomerating and becoming a plastic mass in the enlargement 18 of the kiln.

A furnace constructed and operated as described affords facility for economically smelting refractory ores under conditions not otherwise favourable, as for example the difficulty of obtaining metallurgical coke.

These results are attained by producing a reducing atmosphere in the smelting furnace and by delivering these reducing gases through a kiln through which the charge of ore, its flux and a reducing agent, are slowly but continuously progressed in the opposite direction, whereby the volatile elements of the charge are first driven off and thereafter the ore is reduced to a favourable condition for melting.

The ore in a fully reduced condition and retaining its heat is delivered to a hearth adapted to collect a small quantity in a position where a jet of flame is directly applied to it. The flame being concentrated on a small quantity of the ore at a time completely penetrates and more quickly melts it.

As melted, the metal runs direct into the crucible 7 where it is maintained in that melted state by the heat from the flame which effected the melting. This complete separation of the melted charge affords facility for the purification of the melted metal by pneumatic rabbling.

The process of melting being practically continuous, by variation of the added alloys in successive crucible charges, the grade of metal in the run from successive charges of the crucible may also be varied to meet requirements.

Having now particularly described my invention, I hereby declare that what I claim as new and desired to be protected in by Letters Patent, is:

1. In an apparatus for smelting ores the combination with a smelting furnace, of a kiln through which the charge of ore is passed before its delivery to the furnace and in which kiln the ore is reduced by the hot gases from the furnace, and means adjacent the connection of the furnace to the kiln for tempering the heat of the gases.

2. In apparatus for smelting ore, the combination with a smelting furnace, of a kiln through which the charge of ore is passed before its delivery to the furnace and in which kiln the ore is reduced by the hot gases from the furnace, and means including controlled gas escape apertures from the furnace adjacent the kiln connection thereto for tempering the heat of the gases passing from the furnace into the kiln.

3. In apparatus for smelting ores, the combination with a smelting furnace, of a kiln through which the charge of ore is passed before its delivery to the furnace and in which kiln the ore is reduced by the hot gases from the furnace, means including a water jacketed passage from the furnace to the kiln for tempering the heat of the gases thereto.

4. In apparatus for smelting ores, the combination with a smelting furnace, of a kiln through which the charge of ore is passed before its delivery to the furnace and in which kiln the ore is reduced by the hot gases from the furnace, and means adjacent the connection of the furnace to the kiln for tempering the heat of the gases thereto, said means comprising a controlled gas aperture from the furnace adjacent the kiln connection thereto, and a water jacketed passage from the furnace to the kiln.

5. In apparatus for smelting ores, a furnace comprising in combination, a melting chamber, the lower part of which is formed as a crucible and a hearth above the level of the crucible, which hearth is adapted to collect the charge of ore as delivered, and means for delivering the jet of flame on the collected charge of ore on the hearth, means for reducing the ore prior to delivery on the hearth, said hearth comprising a ledge immediately beneath the place of ore delivery into the furnace, the sides of which ledge slope inward to collect the charge as delivered in the alignment of the flame jet.

6. In apparatus for smelting ore, a furnace proper comprising a melting chamber, the lower part of which is formed as a crucible and has a hearth above the level of the crucible, a kiln extending with a slight upward incline from the upper part of the melting chamber, through which kiln the hot gases from the chamber are passed to an uptake or chimney, means for delivering the charge of ore and fuel into the end of this kiln further from the chamber, means for progressing the charge slowly to the chamber to fall on the hearth thereof, means for tempering the gases as they pass from the chamber to the kiln, means restraining the heat at the delivery of the kiln from becoming excessive, and means for directing the melting flame on the reduced ore on the hearth.

7. In apparatus for smelting ore, the combination with a smelting furnace proper, comprising a melting chamber, the lower part of which is formed as a crucible, and a ledge above the crucible constituting a hearth, a flue extending at a slight upward incline from the upper part of the chamber immediately above the hearth to constitute a reducing kiln, said furnace proper having an inlet aperture in which the adjacent end of said kiln is rotatable, means for delivering the hot gases from the chamber through the kiln, means for controlling such delivery, means for delivering the ore and fuel for its reduction through the kiln in the opposite direction to the hot gases whereby the ore is reduced before its delivery to the hearth, a burner whose axis is directed on the ore on the hearth, means for tapping the metal from the crucible, means for tapping the slag from the upper part of the crucible, and closable means for admitting a rabbling tool through the side walls of the chamber.

8. An apparatus for smelting ore comprising in combination a melting chamber having a hearth on which an ore melting flame is directed, and a crucible into which the metal as melted may flow, a flue through which the hot gases from the melting chamber are delivered and through which in the opposite direction the ore is delivered in a reduced condition to the hearth, said flue thus constituting a kiln for the reduction of the ore, and means for tempering the hot gases as delivered from the melting chamber to the kiln.

9. An apparatus for smelting ore comprising in combination a melting chamber having a hearth on which an ore melting flame is directed, and a crucible into which the metal as melted may flow, a flue through which the hot gases from the melting chamber are delivered and through which in the opposite direction the ore is delivered in a reduced condition to the hearth, said flue thus constituting a kiln for the reduction of the ore, means for tempering the hot gases as delivered from the melting chamber to the kiln, and means for maintaining a substantial constant temperature in the delivering passage from the kiln to the melting chamber.

In testimony whereof I affix my signature.

JOHN H. GRACE.